United States Patent
Lai et al.

(10) Patent No.: US 9,482,892 B2
(45) Date of Patent: Nov. 1, 2016

(54) DISPLAY FRAME DEVICE WITH LOCKING MECHANISM

(71) Applicant: FORHOUSE CORPORATION, Taichung (TW)

(72) Inventors: Yu-Jen Lai, Taoyuan (TW); Chi-Chang Chen, Taoyuan (TW)

(73) Assignee: DARWIN PRECISIONS CORPORATION, Taichung (TW)

( * ) Notice: Subject to any disclaimer, the term of this patent is extended or adjusted under 35 U.S.C. 154(b) by 710 days.

(21) Appl. No.: 13/663,515

(22) Filed: Oct. 30, 2012

(65) Prior Publication Data

US 2013/0207526 A1 Aug. 15, 2013

(30) Foreign Application Priority Data

Feb. 13, 2012 (TW) .............................. 101104515 A

(51) Int. Cl.
*G02F 1/1333* (2006.01)
*G06F 1/16* (2006.01)
*F16B 5/06* (2006.01)

(52) U.S. Cl.
CPC ....... *G02F 1/133308* (2013.01); *F16B 5/0635* (2013.01); *G02F 2001/13332* (2013.01); *G02F 2001/133314* (2013.01); *G02F 2201/46* (2013.01); *G06F 1/1601* (2013.01)

(58) Field of Classification Search
CPC ..... H05K 5/03; H04N 5/64; G02F 1/133308
See application file for complete search history.

(56) References Cited

U.S. PATENT DOCUMENTS

| | | | | |
|---|---|---|---|---|
| 5,268,816 A * | 12/1993 | Abell, Jr. | ................. | G06F 1/162 361/679.09 |
| 6,532,152 B1 * | 3/2003 | White | ............... | G02F 1/133308 312/223.1 |
| 6,611,302 B1 * | 8/2003 | Ueda | ................. | G02F 1/133308 349/58 |
| 6,639,635 B2 * | 10/2003 | Wang | ................. | G02F 1/133308 349/58 |
| 6,828,721 B2 * | 12/2004 | Wakita | ............... | G02F 1/133308 313/365 |
| 7,130,004 B2 * | 10/2006 | Kela | ................. | G02F 1/133308 349/150 |

(Continued)

FOREIGN PATENT DOCUMENTS

| CN | 201207114 Y | 3/2009 |
|---|---|---|
| CN | 101587261 A | 11/2009 |

(Continued)

OTHER PUBLICATIONS

China Office Action dated May 6, 2014.

(Continued)

*Primary Examiner* — Jay Patel
*Assistant Examiner* — Irfan Habib
(74) *Attorney, Agent, or Firm* — Muncy, Geissler, Olds & Lowe, P.C.

(57) ABSTRACT

A display device includes a display module, an outer frame, an active engaging unit, and a passive engaging unit. The display module has at least one side surface. The outer frame surrounds the display module and has last least one inner surface facing the side surface, wherein a gap is formed between the inner surface and the side surface. The active engaging unit extends from the display module into the gap and further extends along the gap. The passive engaging unit is disposed on the inner surface and protrudes toward the side surface. The active engaging unit engages with the passive engaging unit to restrict the relative movement between the display device and the outer frame.

5 Claims, 12 Drawing Sheets

(56) References Cited

U.S. PATENT DOCUMENTS

| | | | | |
|---|---|---|---|---|
| 7,301,761 | B2* | 11/2007 | Merz | G02F 1/133308 248/694 |
| 7,304,837 | B2* | 12/2007 | Lo | G06F 1/1601 248/313 |
| 7,609,529 | B2* | 10/2009 | Chiang | G06F 1/1637 361/729 |
| 7,630,023 | B2* | 12/2009 | Jee | H01R 13/2442 349/58 |
| 7,663,871 | B2* | 2/2010 | Cho | G06F 1/1637 361/679.21 |
| 7,719,628 | B2* | 5/2010 | Suh | G02B 6/0088 349/122 |
| 7,936,413 | B2* | 5/2011 | Jeong | H04N 5/645 349/58 |
| 8,395,722 | B2* | 3/2013 | Mathew | G06F 1/1637 349/56 |
| 8,434,251 | B2* | 5/2013 | Lee | H05K 5/02 292/80 |
| 8,599,331 | B2* | 12/2013 | Zhao | G02F 1/133308 349/58 |
| 8,687,140 | B2* | 4/2014 | Hung | G02F 1/133308 349/58 |
| 8,702,262 | B2* | 4/2014 | Park | G02F 1/133608 362/630 |
| 8,879,021 | B2* | 11/2014 | Kim | G02F 1/133308 349/149 |
| 8,885,110 | B1* | 11/2014 | St. Clair | H04N 5/65 348/836 |
| 8,934,067 | B2* | 1/2015 | Jung | F16M 11/22 248/917 |
| 9,036,110 | B2* | 5/2015 | Hwang | G02F 1/1309 349/58 |
| 9,239,483 | B2* | 1/2016 | Isobe | G02F 1/133308 |
| 2003/0128307 | A1 | 7/2003 | Ito et al. | |
| 2004/0141102 | A1* | 7/2004 | Lin | G02F 1/133308 349/58 |
| 2005/0185397 | A1 | 8/2005 | Chu | |
| 2006/0077627 | A1* | 4/2006 | Zhang | H04N 5/64 361/679.21 |
| 2006/0233603 | A1* | 10/2006 | Cadio | H04N 5/64 403/329 |
| 2007/0063633 | A1* | 3/2007 | Yokota | H01J 9/242 313/495 |
| 2007/0216702 | A1* | 9/2007 | Takahashi | H04N 5/64 345/582 |
| 2008/0062663 | A1* | 3/2008 | Tsuo | G06F 1/1601 361/752 |
| 2008/0089018 | A1* | 4/2008 | Kim | G02F 1/133308 361/679.01 |
| 2009/0244437 | A1* | 10/2009 | Yamaguchi | G02F 1/133308 349/60 |
| 2011/0013111 | A1* | 1/2011 | Wang | H04N 5/64 349/58 |
| 2011/0044013 | A1* | 2/2011 | Wei | H04M 1/0277 361/749 |
| 2011/0126440 | A1* | 6/2011 | Lee | H05K 5/02 40/700 |
| 2012/0026658 | A1* | 2/2012 | Yoshimatsu | H04N 5/64 361/679.01 |

FOREIGN PATENT DOCUMENTS

| | | |
|---|---|---|
| CN | 102290001 A | 12/2011 |
| TW | 200304027 A | 9/2003 |
| TW | 200528667 A | 9/2005 |
| TW | 201027172 A | 7/2010 |

OTHER PUBLICATIONS

English translation of abstract of CN 102290001 A (published Dec. 21, 2011).

English translation of abstract of CN 101587261 A (published Nov. 25, 2009).

English translation of abstract of CN 201207114 Y (published Mar. 11, 2009).

Taiwan Office Action dated Feb. 19, 2014.

English translation of abstract and paragraphs of TW 201027172 A (published Jul. 16, 2010).

* cited by examiner

DISPLAY FRAME DEVICE WITH LOCKING MECHANISM

BACKGROUND OF THE INVENTION

1. Field of the Invention

This invention generally relates to a display device. More specifically, this invention relates to a display device with an engaging unit.

2. Description of the Related Art

Recently, the demand of LCD displays increases rapidly due to their thin thickness, light weight, portability, and low radiation with respect to CRT displays.

As the related art shown in FIG. 1, a display device includes a display module 10 and an outer frame 30. The display module 10 has a display face 11 and a bottom face 13. The display module 10 includes a back cover 14 disposed on the bottom of the entire display module 10 for receiving other parts of the display module 10. The bottom face 13 is formed on the inner side of the back cover 14. As shown in FIG. 1, a screw is generally used to screw and fix the display module 10 with the outer frame 30. More particularly, the screw 20 penetrates the inner surface 31 of the outer frame 30 and the side wall 12 of the back cover 14 to screw and fix the display module 10 to the outer frame 30.

However, the specification of the display device has to be adjusted in accordance with the size requirement of the final commercial product. For example, considering the appearance design and the volume minimization, the thickness of the outer frame 30 and the side wall 12 are decreasing. As a result, the strength and the fixing ability are decreased. Moreover, the appearance of the product is impaired due to the exposure of the screw 20.

SUMMARY OF THE INVENTION

It is an object of the present invention to provide a display device having a frame with narrower width.

It is another object of the present invention to provide a display device having better structure fixity.

It is still another object of the present invention to provide a display device having less screws exposed.

The display device of the present invention includes a display module, an outer frame, an active engaging unit, and a passive engaging unit. The display module has at least one side surface. The outer frame surrounds the display module and has last least one inner surface facing the side surface, wherein a gap is formed between the inner surface and the side surface. The active engaging unit extends from the display module into the gap and further extends along the gap. The passive engaging unit is disposed on the inner surface and protrudes toward the side surface. The active engaging unit engage with the passive engaging unit to restrict the relative movement between the display device and the outer frame along the direction parallel to the inner surface.

The active engaging unit includes a fixing part and an engaging part. The engaging part extends from an end of the fixing part and bends with respect to the fixing part. The fixing part is fixed on a bottom face of the display module, wherein the engaging part is a plate inserted into the gap to engage with the passive engaging unit. The extending direction of the fixing part is substantially perpendicular to the extending direction of the engaging part on the projection plane parallel to the bottom face. The passive engaging unit is a slot disposed on the inner surface and has an opening opposite to the bottom face. The engaging part is a plate hook inserted into the slot through the opening along the gap. The slot is integrally formed on the inner surface.

The outer frame includes a front plate extending toward the center of the display module from an end of the inner surface that is located away from the bottom face. The distance between the opening of the slot and the front plate is larger than the height of the plate hook inserted into the slot. The passive engaging part is a plate attached onto the inner surface. A hole is formed on the plate. A part of the plate considered as one side of the hole protrudes outward and away from the inner surface to form the slot.

The passive engaging unit is a slot disposed on the inner surface and has an opening facing the bottom face. The engaging part is inserted into the slot through the opening along the gap. The passive engaging part is a plate attached onto the inner surface. A hole is formed on the plate. A part of the plate considered as one side of the hole protrudes outward and away from the inner surface to form the slot. The slot is integrally formed on the inner surface.

The passive engaging unit is an engaging piece disposed on the inner surface. The engaging part has a clamp structure and includes an upper clamping arm and a lower clamping arm. The upper clamping arm and the lower clamping arm respectively extend into the upper end of the engaging piece near the bottom face and the lower end of the engaging piece away from the bottom face to engage with the engaging piece. The thickness of the engaging piece in the gap is larger than the thickness of the upper clamping arm and the thickness of the lower clamping arm. The engaging piece includes a connecting part and a protruding part. The connecting part is a plate attached onto the inner surface. The protruding part extends from one end of the connecting part. The protruding part is narrower than the connecting part and leaves spaces at the upper side and the lower side of the connecting part with respect to the bottom face for the upper clamping arm and the lower clamping arm to extend into and engage with the protruding part.

The display module includes a back cover having a bottom face and a side edge. The side edge bends to form a side wall. The active engaging unit is integrally formed on the side wall. The passive engaging unit is a slot having an opening facing the back cover. The engaging part is inserted into the slot along the gap. The passive engaging unit is a first protruding part protruding toward the side wall. The active engaging unit is a second protruding part protruding toward the inner surface. The second protruding part is under the first protruding part with respect to the bottom face. The first protruding part props up the second protruding part to prevent the display module from separating from the outer frame along the gap and toward the back cover.

DETAILED DESCRIPTION OF THE PREFERRED EMBODIMENT

The present invention provides a display device. In the preferred embodiment, the display device is a LCD having backlight module. In different embodiments, however, the display device can be self-illumination type display device or ambient-light-reflection type display device.

Figure 1:
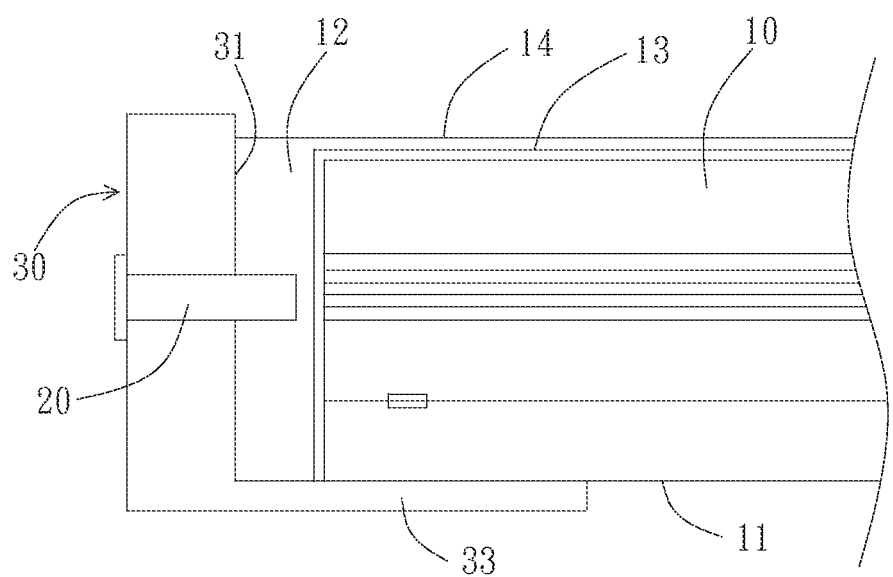
FIG. 1 is a cross-sectional view of the related art.
Figure 2A:
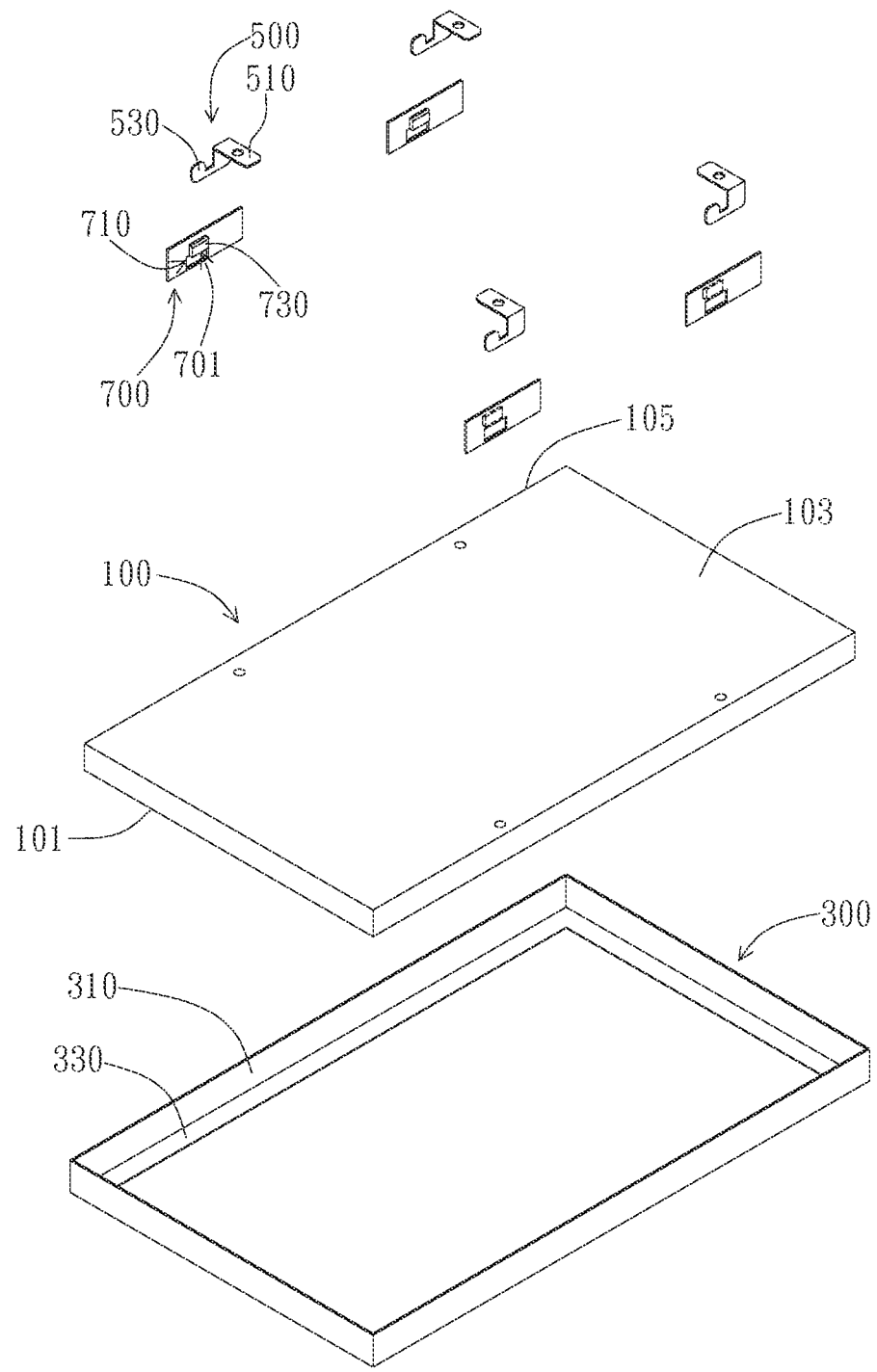
FIG. 2A is an exploded view of an embodiment of the display device of the present invention.
Figure 2B:
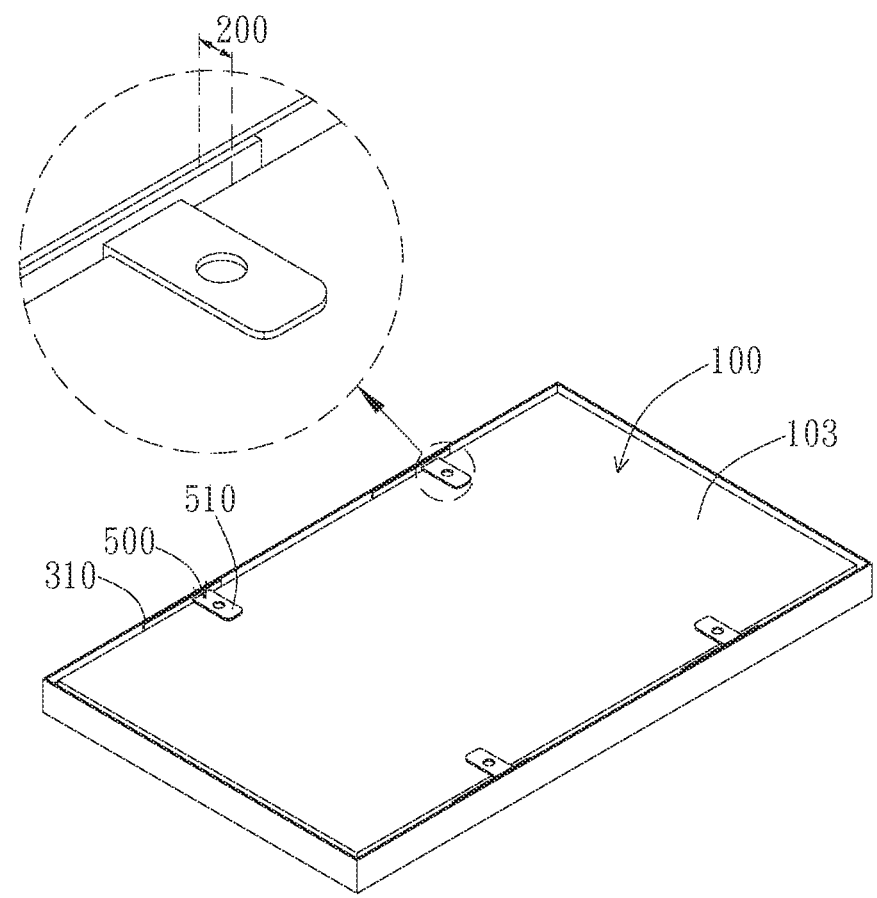
FIG. 2B is an assembled view of the embodiment shown in FIG. 2A.

As the embodiment shown in FIGS. 2A and 2B, the display device includes a display module 100, an outer frame 300, an active engaging unit 500, and a passive engaging unit 700. The display module 100 is preferably a LCD display module. In different embodiments, however, the display module 100 can be a different type of display module, such as self-illumination type. The display module 100 has a display face 101, a bottom face 103, and at least one side surface 105.

Figure 3:
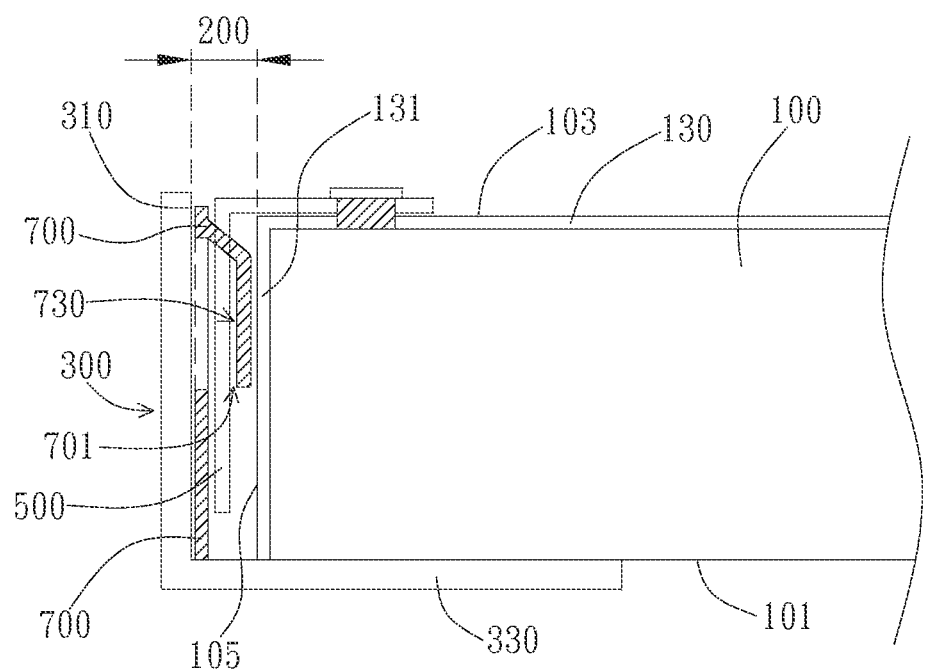
FIG. 3 is a cross-sectional view of the embodiment shown in FIG. 2A.

The side surface 105 preferably surrounds the side of the display face 101, which includes upper, lower, left, and right sides of the display face 101. As shown in FIG. 2B, the outer frame 300 surrounds four sides of the display module 100, i.e. the outer frame 300 covers the side surface 105 of the display module 100. The inner surface 310 of the outer frame 300 faces the side surface 105 of the display module 100. As shown in FIG. 3, a gap 200 is formed between the inner surface 310 and the side surface 105. Moreover, in this embodiment, the outer frame 300 further includes a front plate 330. The front plate 330 extends toward the center of the display module 100 from an end of the inner surface 310 that is located away from the bottom face 103. In other words, the front plate 330 extends toward the center of the display module 100 from an end of the inner surface 310 that is located close to the display face 101. While assembling, the outer frame 300 is put around the display module 100 from the display face 101, wherein the inner surface 310 surrounds the sides of the display module 100. The front plate 330 partially covers the display face 101, wherein the front plate 330 is disposed to form an opening area, by which the display face 101 is exposed and displays images.

As shown in FIGS. 2B and 3, the active engaging unit 500 extends from the display module 100 into the gap 300 between the inner surface 310 and the side surface 105 and further extends along the gap 200. For decreasing the thickness of the frame of the display device, the active engaging unit 500 is preferably of a plate or sheet shape to facilitate the reduction of the gap 200. In this embodiment, the active engaging unit 500 is a part independent from the display module 100. In other embodiments, the active engaging unit 500 can be integrally formed with some parts of the display module 100.

Figure 4:
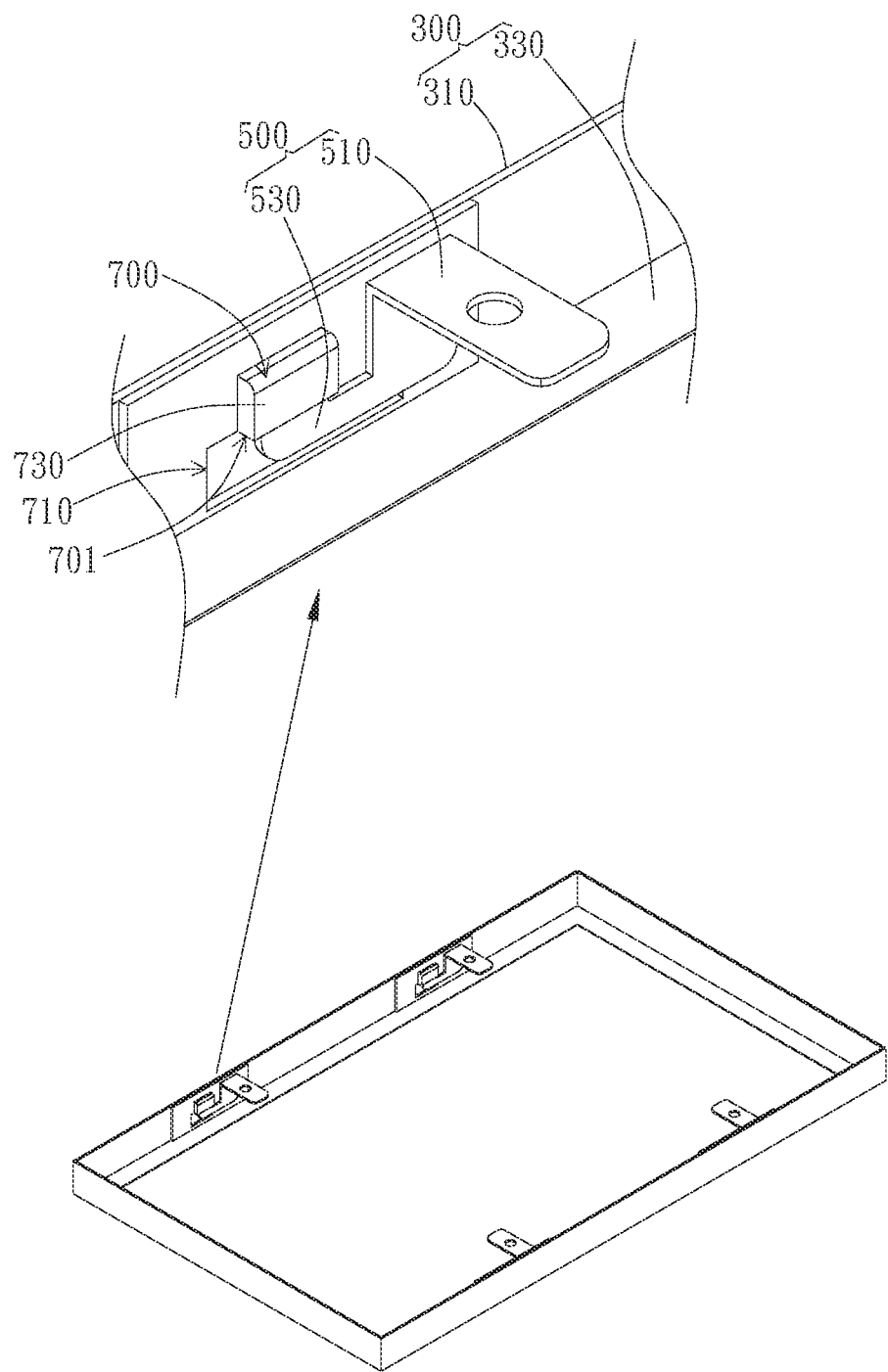
FIG. 4 is a partial enlarged view of the embodiment shown in FIG. 2A.

As the embodiment shown in FIGS. 2A and 4, the active engaging unit 500 includes a fixing part 510 and an engaging part 530. The engaging part 530 extends from an end of the fixing part 510 and bends with respect to the fixing part 510.

The extending direction of the fixing part 510 is substantially perpendicular to the extending direction of the engaging part 530 on the projection plane parallel to the bottom face 103. As shown in FIG. 2A, the fixing part 510 is fixed on the bottom face 103 of the display module 100. In the preferred embodiment, the fixing part 510 is screwed onto the bottom face 103. In other embodiments, however, the fixing part 510 can be fixed onto the bottom face 103 by other methods, such as soldering. Further, as shown in FIG. 3, the display module 100 includes a back cover 130 disposed on the bottom of the entire display module 100 for receiving other parts of the display module 100. The back cover 130 has a bottom face 103 and a side edge. The bottom face 103 is formed on the bottom side of the back cover 130. In other words, the fixing part 510 is fixed onto the bottom side of the back cover 130. As shown in FIGS. 2A and 3, the side edge of the back cover 130 bends to form a side wall 131. In this embodiment, the outer surface of the side wall 131 serves as the side surface 105 of the display module 100. After bending from the end of the fixing part 510, the engaging part 530 is inserted into the gap 200 between the side surface 105 and the inner surface 310. As mentioned above, the active engaging unit 500 is preferably of a plate or sheet shape to facilitate the reduction of the gap 200.

Figure 5:
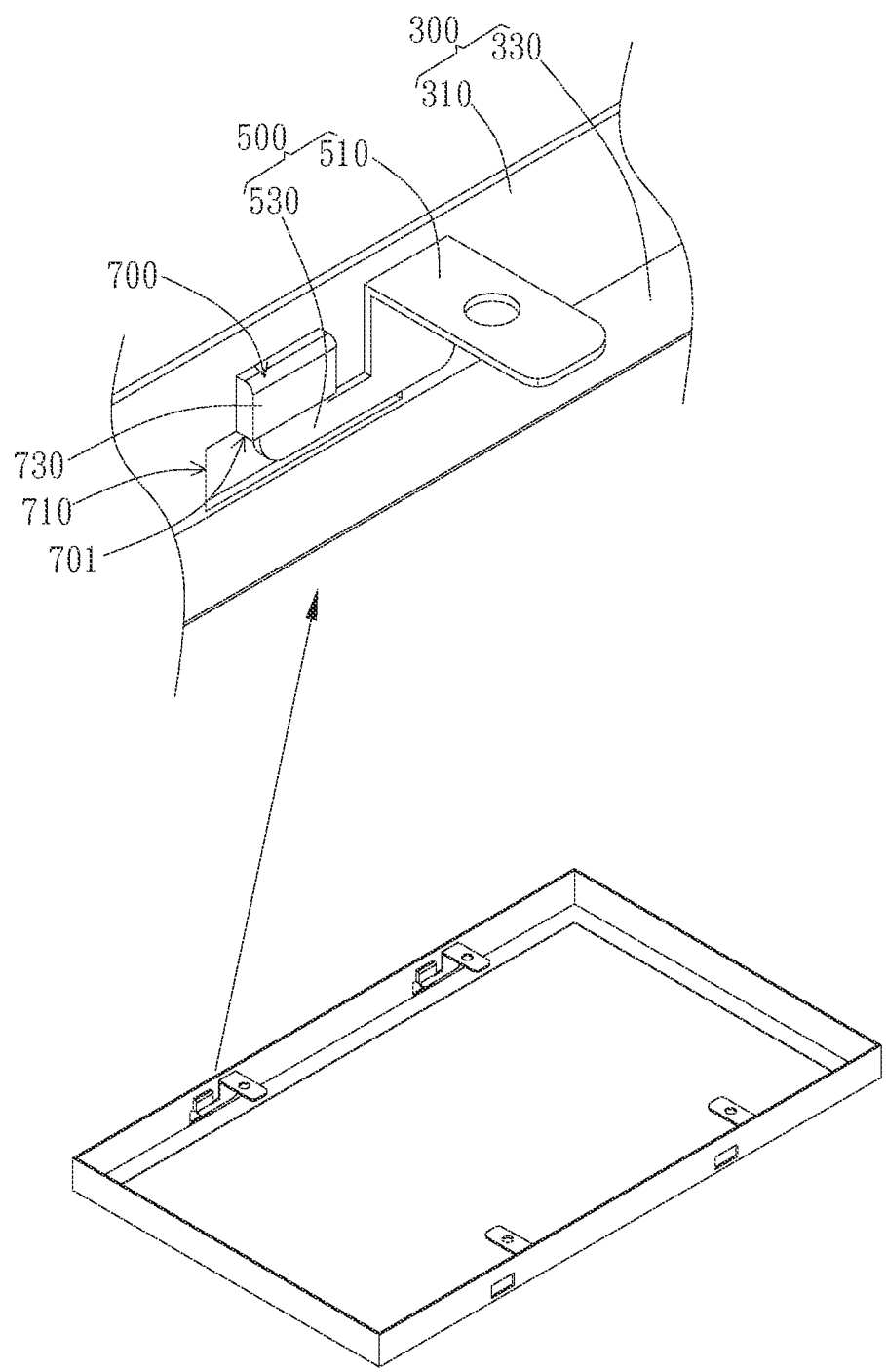
FIG. 5 is a schematic view of the passive engaging unit of another embodiment of the display device.

The passive engaging unit 700 is disposed on the inner surface 310 and protrudes toward the side surface 105. As shown in FIGS. 2A and 4, the passive engaging unit 700 is a slot 730 disposed on the inner surface 310 and has an opening 701 opposite to the bottom face 103 of the display device 100. In other words, the opening 701 faces the display face 101 (see FIGS. 2A and 3). As shown in FIG. 4, the passive engaging unit 700 is a part independent from the inner surface 310 and is attached onto the inner surface 310 by adhering, soldering, and etc. The passive engaging part 700 is a plate attached to the inner surface 310. A hole 710 is formed on the plate, a part of the plate considered as one side of the hole 710 protrudes outward and away from the inner surface 310 to form the slot 730 having the opening 701. As a different embodiment shown in FIG. 5, the passive engaging unit 700 can be integrally formed on the inner surface 310 by other methods, such as injection-molding.

Figure 6A:
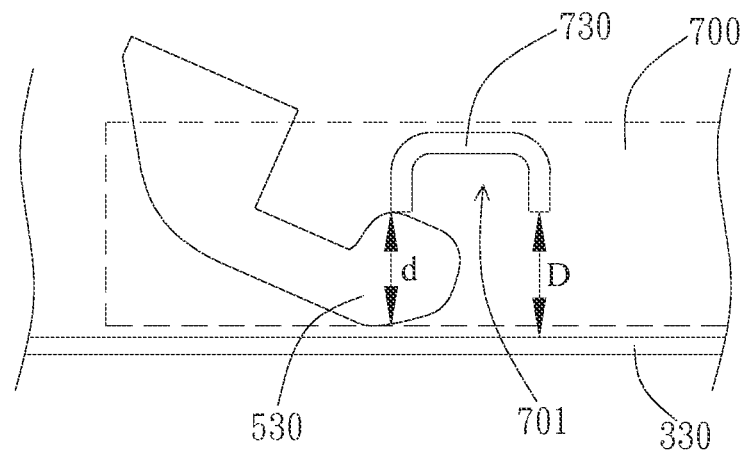
FIGS. 6A and 6B are schematic views showing the assembly operation of the active engaging unit.
Figure 6B:
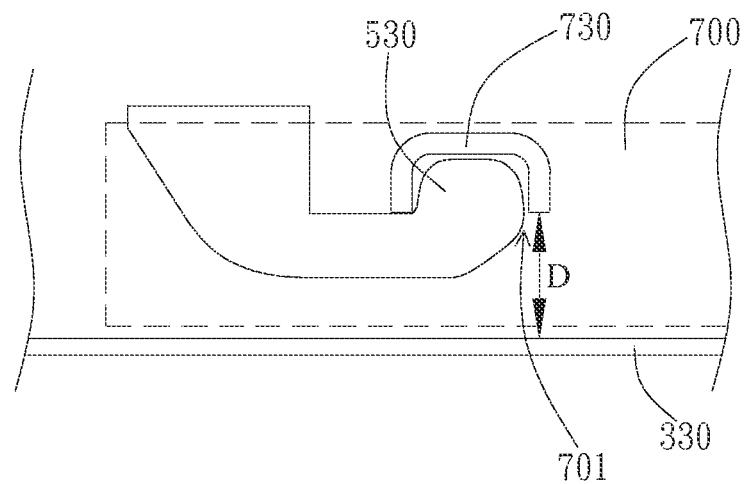

As shown in FIGS. 6A and 6B, the engaging part 530 is a plate hook that can be inserted into the slot 730 through the opening 701 along the gap 200. In the preferred embodiment, the distance "D" between the opening 701 of the slot 730 and the front plate 330 of the outer frame 300 is larger than the height "d" of the plate hook of the front end of the engaging part 530 inserted into the slot 730. As a result, the engaging part 530 can be inserted into the gap 200 and inserted into the opening 701 through the space between the opening 701 of the slot 730 and the front plate 330 of the outer frame 300. After assembling, the active engaging unit 500 engages with the passive engaging unit 700 to restrict the relative movement between the display device 100 and the outer frame 310 along the direction parallel to the inner surface 310. More particularly, by means of the engagement between the engaging part 530 and the slot 730, the relative movement between the display device 100 and the outer frame 310, other than in a direction that the engaging part 530 escapes downward from the opening 701, is restricted. On the other hand, the relative movement between the display device 100 and the outer frame 310 in this direction (i.e. downward direction) is also restricted since the display module 100 is blocked by the front plate 330 of the outer frame 300 when the display module 100 moves downward. As a result, the display device of the present invention not only has a narrower frame but also a better structure fixity.

Besides, since no screw is directly used to screw the outer frame 300 onto the display module 100 from the side surface, the exposure of the screw is decreased as well as the appearance of the product can be enhanced.

Figure 7A:
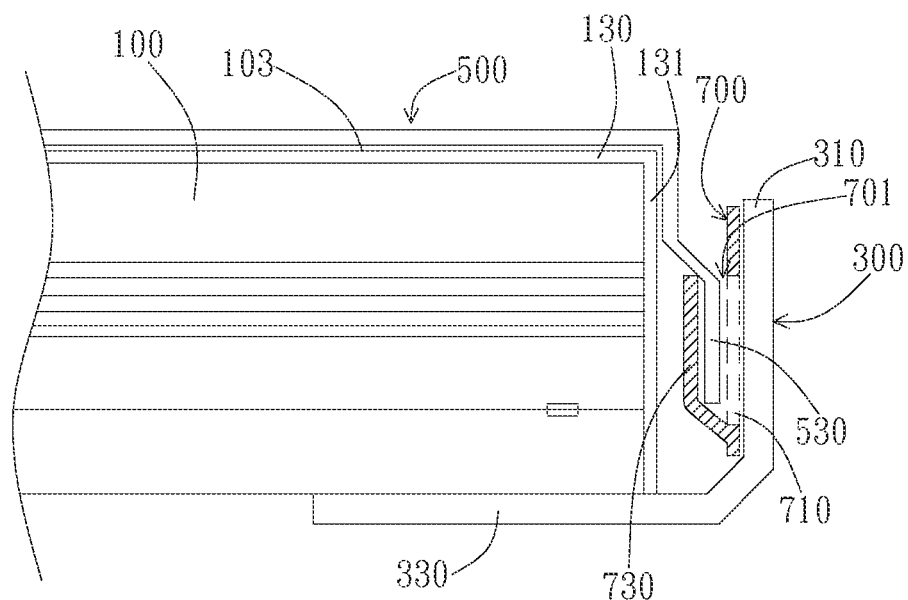
FIG. 7A is a cross-sectional view of another embodiment.
Figure 7B:
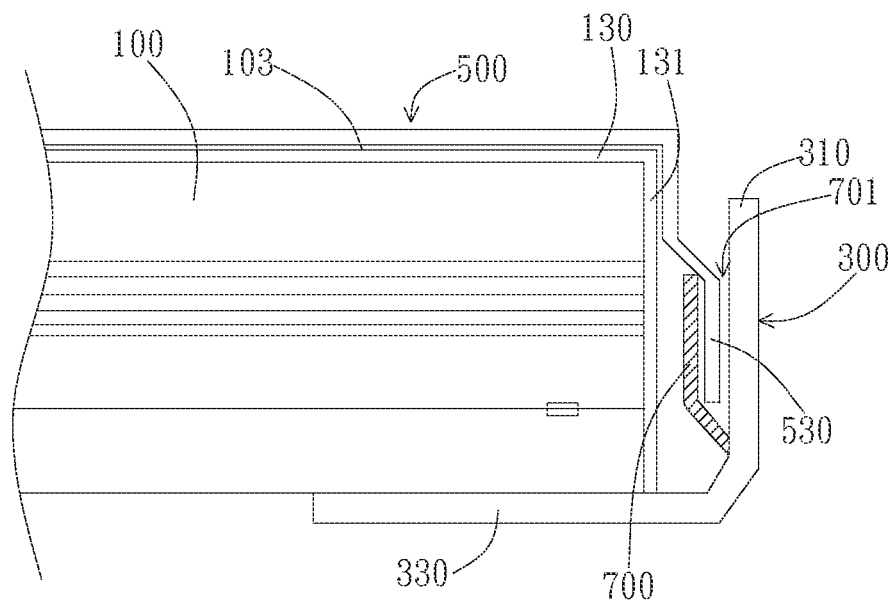
FIG. 7B is a cross-sectional view of another embodiment.

As the embodiment shown in FIGS. 7A and 7B, the opening 701 of the slot 730 of the passive engaging unit 700 faces the bottom face 103 of the display device 100. The engaging part 530 of the active engaging unit 500 is a plate directly inserted into the opening 701 of the slot 730 from the upper side to complete the engagement. By means of the engagement between the engaging part 530 and the slot 730, the relative movement between the display device 100 and the outer frame 300, other than a direction that the engaging part 530 escapes from the opening 701 (i.e. upward direction), is restricted. As shown in FIG. 7A, the passive engaging unit 700 is a part independent from the inner surface 310 and is attached onto the inner surface 310 by adhering, soldering, and etc. The passive engaging part 700 is a plate attached to the inner surface 310. A hole 710 is formed on the plate, a part of the plate considered as one side of the hole 710 protrudes outward and away from the inner surface 310 to form the slot 730 having the opening 701. As a different embodiment shown in FIG. 7B, the passive engaging unit 700 can be integrally formed on the inner surface 310 by other methods, such as injection-molding.

Figure 8A:
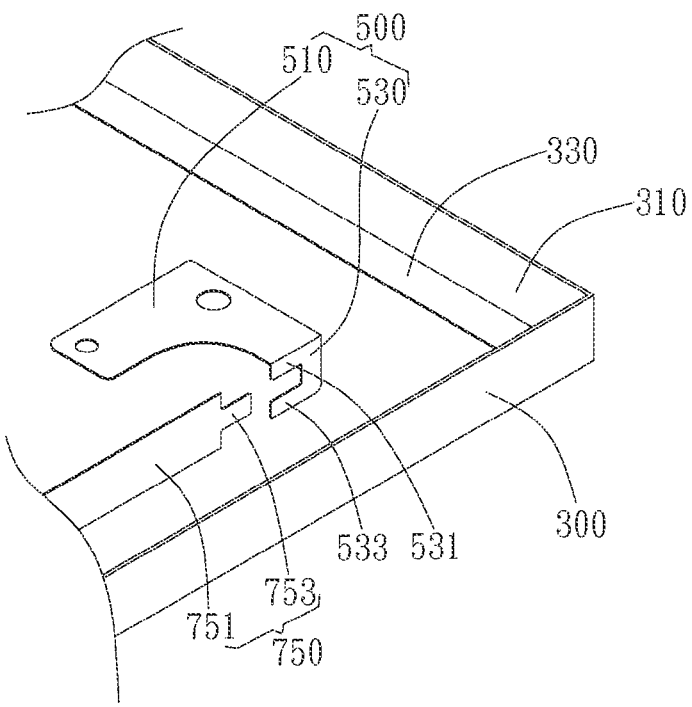
FIGS. 8A and 8B are a schematic view and a cross-sectional view of another embodiment of the display device.
Figure 8B:
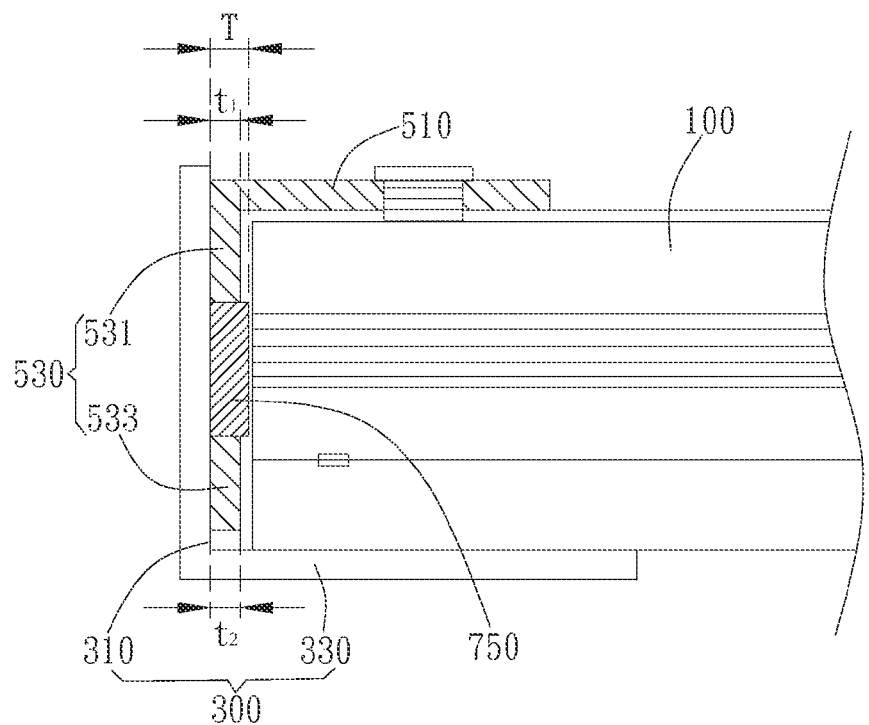

As another embodiment of the present invention shown in FIGS. 8A and 8B, the passive engaging unit 700 is an engaging piece 750 disposed on the inner surface 310. The engaging part 530 has a clamp structure and includes an upper clamping arm 531 and a lower clamping arm 533. The upper clamping arm 531 and the lower clamping arm 533 both extend along the direction parallel to the outer frame 300, wherein these arms are plates parallel to the inner surface 310 and form a receiving space therebetween. The upper clamping arm 531 and the lower clamping arm 533 respectively extend to the upper end of the engaging piece 750 near the bottom face 103 and the lower end of the engaging piece 750 away from the bottom face 103, so that the engaging piece 750 is wedged in the receiving space between the upper engaging arm 531 and the lower engaging arm 533. As the preferred embodiment shown in FIG. 8B, the thickness of the engaging piece 750 in the gap 200 is larger than the thickness $t_1$ of the upper clamping arm 531 and the thickness $t_2$ of the lower clamping arm 533.

Furthermore, in the preferred embodiment, the engaging piece 750 is a part independent from the inner surface 310 and is attached onto the inner surface 310 by adhering, soldering, and etc. The engaging piece 750 includes a connecting part 751 and a protruding part 753. The connecting part 751 is a plate attached onto the inner surface 310, wherein the protruding part 753 extends from one end of the connecting part 751 along the direction parallel to the outer frame. In other words, the extending direction of the protruding part 753 is parallel to the extending direction of the upper clamping arm 531 and the lower clamping arm 533. The protruding part 753 is narrower than the connecting part 751 in the cross-section of its extending direction and leaves space at the upper side and the lower side of the connecting part 751 with respect to the bottom face 103, so that the upper clamping arm 531 and the lower clamping arm 533 can be inserted into and engage with the protruding part 753. In other embodiments, however, the engaging piece 750 can be integrally formed on the inner surface 310 by other methods, such as injection-molding.

The above structure further decreases the thickness of the engaging mechanism. By means of the engagement between the engaging part 530 and the engaging piece 750, the relative movement between the display device 100 and the outer frame 310, other than a direction that the engaging part 530 escapes from the engaging piece 700 (i.e. lateral direction), is restricted. Because the thickness of the engaging piece 750 is preferably larger than the thickness of the upper clamping arm 531 and the lower clamping arm 533, it remains in engagement status when slight deformation occurs in the direction perpendicular to the inner surface 310.

Figure 8C:
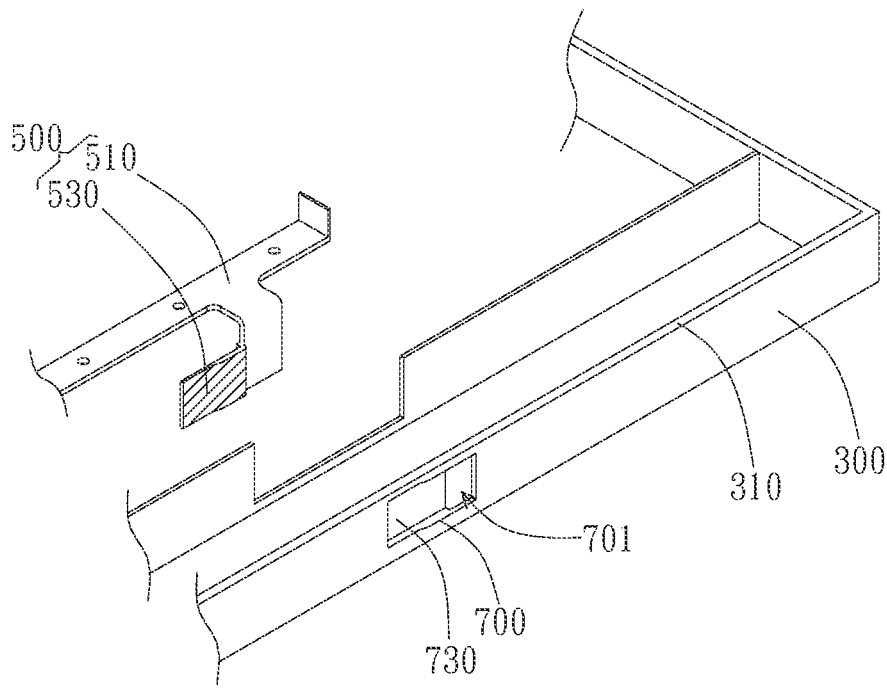
FIG. 8C is an exploded view of another embodiment of the display device of the present invention.
Figure 8D:
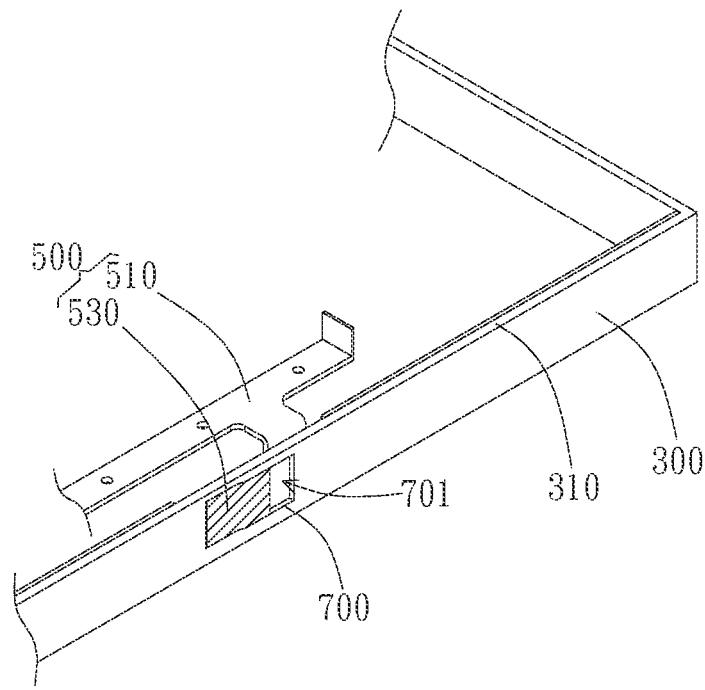
FIG. 8D is an assembled view of the embodiment shown in FIG. 8C.

As shown in FIGS. 8C and 8D, the active engaging unit 500 includes a fixing part 510 and an engaging part 530. The engaging part 530 extends from an end of the fixing part 510 along the direction parallel to the outer frame 300 and bends with respect to the fixing part 510. The extending direction of the fixing part 510 is substantially parallel to the extending direction of the engaging part 530 on the projection plane parallel to the bottom face 103. The passive engaging unit 700 is a slot 730 disposed along the direction parallel to the outer frame 300 on the inner surface 310 and has an opening 701 for the engaging part 530 to be inserted into the slot 730. In this embodiment, the passive engaging unit 700 can be integrally formed on the inner surface 310 by a method such as pressing. In other embodiments, however, the passive engaging unit 700 is a part independent from the inner surface 310 and is attached onto the inner surface 310 by adhering, soldering, and etc.

Figure 9:
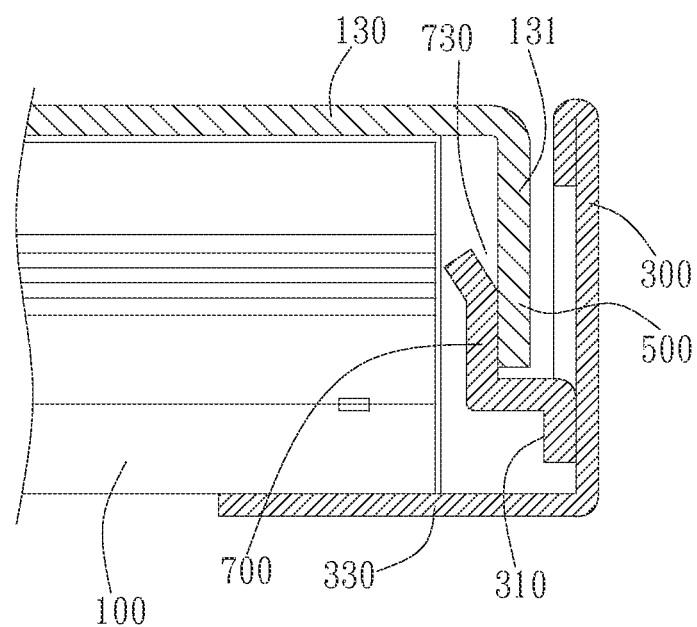
FIG. 9 is a cross-sectional view of the display device having an integrally formed active engaging unit.

As another embodiment of the present invention shown in FIG. 9, the active engaging unit 500 is integrally formed on the side wall 131 of the back cover 130. As shown in FIG. 9, the passive engaging unit 700 is integrally formed on the inner surface 310 of the outer frame 300 by bending back the side wall of the outer frame 300 to form a plate, which is then process and bends to form a slot 730. The passive engaging unit 700 is the slot 730 having an opening facing the back cover 130, wherein the active engaging unit 500 is a plate extending from the side wall 131 and is inserted into the slot 730 along the gap 200 to engage with the slot 730.

Figure 10A:
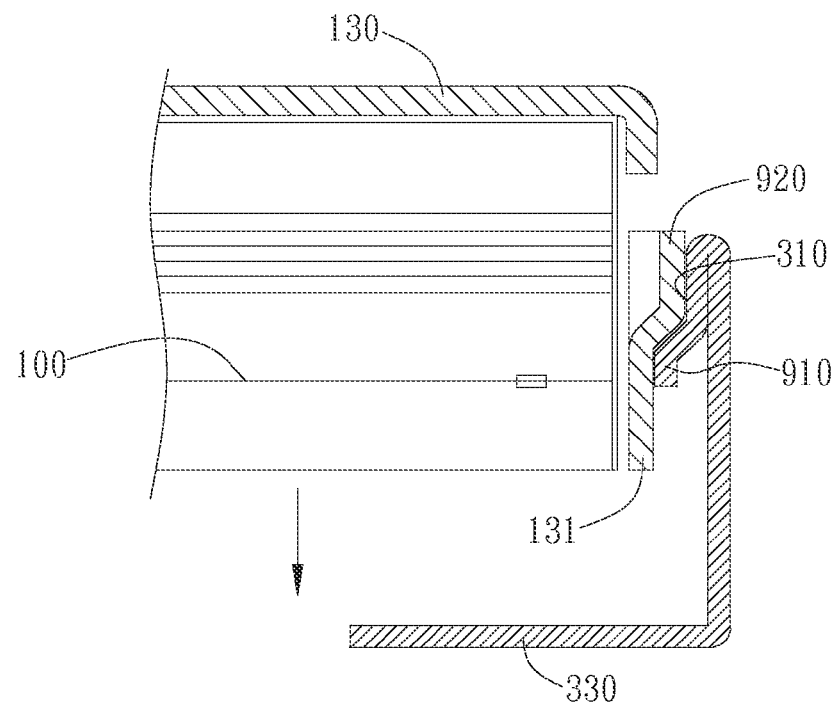
FIGS. 10A and 10B are cross-sectional views of different embodiments of the display device having an integrally formed active engaging unit.
Figure 10B:
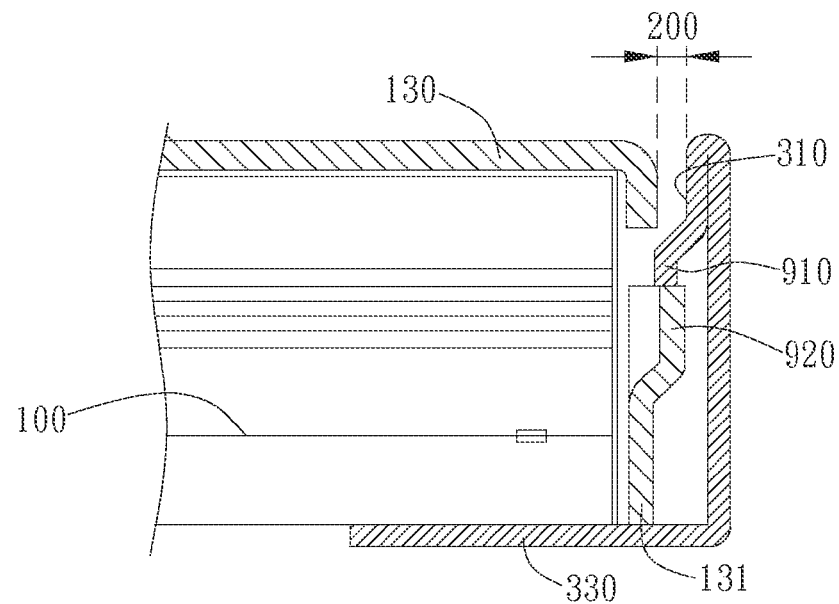

In the embodiment shown in FIGS. 10A and 10B, the passive engaging unit is a first protruding part 910 protruding toward the side wall 131. The active engaging unit is a second protruding part 920 protruding toward the inner surface 310. The second protruding part 920 is under the first protruding part 910 with respect to the bottom face 103. In the preferred embodiment, both the first protruding part 910 and the second protruding part 920 are protruding structures made by punching a metal plate. For example, the plate of the outer frame 300 is first punched to form the first protruding part 910 and then bent over to become a part of the inner surface 310. The first protruding part 910 props up the second protruding part 920 to prevent the display module 100 from separating from the outer frame 300 along the gap 200 and toward the back cover 130. In this embodiment, the display module 100 is placed into the outer frame 300 along the inner surface 310 while assembling. At this time, the root of the second protruding part 920 presses against the root of the first protruding part 910. Since the roots of the two protruding parts both have an incline, the second protruding part 920 is able to push the first protruding part 910 outward away. After the second protruding part 920 passes through the first protruding part 910, the first protruding part 910 returns to its original position to engage with the second protruding part 920.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A display device, comprising:
   a display module having at least one side surface;
   an outer frame surrounding the display module and having last least one inner surface facing the side surface, wherein a gap is formed between the inner surface and the side surface;
   an active engaging unit extending from the display module into the gap and further extending along the gap; and
   a passive engaging unit disposed on the inner surface and protruding toward the side surface, wherein the active engaging unit engages with the passive engaging unit to restrict the relative movement between the display device and the outer frame along the direction parallel to the inner surface, wherein
   the active engaging unit includes a fixing part and an engaging part,
   the engaging part extends from an end of the fixing part and bends with respect to the fixing part,
   the fixing part is fixed on a bottom face of the display module,
   the engaging part is a plate inserted into the gap to engage with the passive engaging unit,
   the passive engaging unit is a slot disposed on the inner surface and has an opening opposite to the bottom face,
   the engaging part is a plate hook inserted into the slot through the opening along the gap,
   the fixing part and the engaging part are two plates substantially perpendicular to each other,
   the enagaging part includes a connections portion, a first end edge and a second end edge arranged in a co-planar manner, the engaging part is connected to the fixing part by the first end edge, the first end edge is connected between the fixing part and the connection portion, the connection portion is connected between the first end edge and the second end edge, the first end edge and the second end edge are spaced from each other at a distance and concurrently arranged at a side of the connection portion, and
   the engaging part is engaged with the passive engaging unit in a way that the second end edge extends into the slot through the opening of the passive engaging unit, and the connection portion and the first end edge stay outside the opening, wherein the slot of the passive engaging unit has inner walls located inside the gap and capping on the engaging part in a way that the engaging part is prohibited from movement towards the bottom face, the side surface, the inner surface and an elongated direction of the gap that is parallel to the bottom surface; wherein the slot of the passive engaging unit has inner walls located inside the gap and capping on the engaging part, and the inner walls of the passive engaging unit is between the side surface of the display module and the second end edge of the engaging part.

2. The display device of claim 1, wherein the extending direction of the fixing part is substantially perpendicular to the extending direction of the engaging part on the projection plane parallel to the bottom face.

3. The display device of claim 1, wherein the outer frame includes a front plate extending toward the center of the display module from an end of the inner surface that is located away from the bottom face, the distance between the opening of the slot and the front plate is larger than the height of the plate hook inserted into the slot.

4. The display device of claim 1, wherein the passive engaging part is a plate attached onto the inner surface, a hole is formed on the plate, a part of the plate considered as one side of the hole protrudes outward and away from the inner surface to form the slot.

5. The display device of claim 1, wherein the slot is integrally formed on the inner surface.

* * * * *